(12) United States Patent
Zhu et al.

(10) Patent No.: US 9,331,869 B2
(45) Date of Patent: May 3, 2016

(54) INPUT/OUTPUT REQUEST PACKET HANDLING TECHNIQUES BY A DEVICE SPECIFIC KERNEL MODE DRIVER

(75) Inventors: Timothy Zhu, Bellevue, WA (US); David Dunn, Sammamish, WA (US); Randy Spurlock, Woodinville, WA (US); Thomas Spacie, Seattle, WA (US)

(73) Assignee: NVIDIA CORPORATION, Santa Clara, CA (US)

( * ) Notice: Subject to any disclaimer, the term of this patent is extended or adjusted under 35 U.S.C. 154(b) by 807 days.

(21) Appl. No.: 12/717,142

(22) Filed: Mar. 4, 2010

(65) Prior Publication Data

US 2011/0216780 A1    Sep. 8, 2011

(51) Int. Cl.
G06F 3/00    (2006.01)
H04L 12/54   (2013.01)
G06F 13/10   (2006.01)

(52) U.S. Cl.
CPC .............. H04L 12/56 (2013.01); G06F 13/102 (2013.01)

(58) Field of Classification Search
CPC ..................................................... G06F 13/102
USPC ................................................. 719/310, 321
See application file for complete search history.

(56) References Cited

U.S. PATENT DOCUMENTS

| | | | |
|---|---|---|---|
| 3,940,740 A | 2/1976 | Coontz | |
| 4,208,810 A | 6/1980 | Rohner et al. | |
| 4,412,281 A | 10/1983 | Works | |
| 4,449,730 A | 5/1984 | Oberleitner et al. | |
| 4,541,075 A | 9/1985 | Dill et al. | |
| 4,773,044 A | 9/1988 | Sfarti et al. | |
| 4,885,703 A | 12/1989 | Deering | |
| 4,918,626 A | 4/1990 | Watkins et al. | |
| 4,949,280 A | 8/1990 | Littlefield | |
| 4,951,220 A | 8/1990 | Ramacher et al. | |
| 4,985,988 A | 1/1991 | Littlebury | |
| 5,036,473 A | 7/1991 | Butts et al. | |
| 5,077,660 A | 12/1991 | Haines et al. | |
| 5,081,594 A | 1/1992 | Horsley | |
| 5,107,455 A | 4/1992 | Haines et al. | |
| 5,125,011 A | 6/1992 | Fung | |
| 5,276,893 A | 1/1994 | Savaria | |
| 5,287,438 A | 2/1994 | Kelleher | |
| 5,313,287 A | 5/1994 | Barton | |
| 5,345,587 A * | 9/1994 | Fehskens et al. | ............. 718/102 |

(Continued)

FOREIGN PATENT DOCUMENTS

| | | |
|---|---|---|
| CN | 101093578 A | 12/2007 |
| JP | 61020348 A2 | 1/1986 |

(Continued)

OTHER PUBLICATIONS

Kristis Makris, Dynamic and Adaptive Updates of Non-Quiescent Subsystems in Commodity Operating system Kernels,Mar. 21, 2007.*

(Continued)

*Primary Examiner* — Lechi Truong (57) ABSTRACT

The input/output request packet (IRP) handling technique includes determining if a received input/output request packet should receive a given handling. If the input/output request packet should receive the given handling, the input/output request packet is dispatched to a device specific dispatch input/output request packet handler. Otherwise, the input/output request packet is redirected to an operating system dispatch input/output request packet handler.

16 Claims, 3 Drawing Sheets

(56) References Cited

U.S. PATENT DOCUMENTS

| | | |
|---|---|---|
| 5,379,405 A | 1/1995 | Ostrowski |
| 5,392,437 A | 2/1995 | Matter et al. |
| 5,400,777 A | 3/1995 | Olsson et al. |
| 5,408,606 A | 4/1995 | Eckart |
| 5,432,898 A | 7/1995 | Curb et al. |
| 5,446,836 A | 8/1995 | Lentz et al. |
| 5,448,496 A | 9/1995 | Butts et al. |
| 5,452,104 A | 9/1995 | Lee |
| 5,452,412 A | 9/1995 | Johnson, Jr. et al. |
| 5,455,536 A | 10/1995 | Kono et al. |
| 5,483,258 A | 1/1996 | Cornett et al. |
| 5,498,975 A | 3/1996 | Cliff et al. |
| 5,513,144 A | 4/1996 | O'Toole |
| 5,513,354 A | 4/1996 | Dwork et al. |
| 5,517,666 A | 5/1996 | Ohtani et al. |
| 5,530,457 A | 6/1996 | Helgeson |
| 5,543,935 A | 8/1996 | Harrington |
| 5,570,463 A | 10/1996 | Dao |
| 5,574,847 A | 11/1996 | Eckart et al. |
| 5,578,976 A | 11/1996 | Yao |
| 5,594,854 A | 1/1997 | Baldwin et al. |
| 5,623,692 A | 4/1997 | Priem et al. |
| 5,630,171 A | 5/1997 | Chejlava, Jr. et al. |
| 5,633,297 A | 5/1997 | Valko et al. |
| 5,634,107 A | 5/1997 | Yumoto et al. |
| 5,638,946 A | 6/1997 | Zavracky |
| 5,664,162 A | 9/1997 | Dye |
| 5,671,376 A | 9/1997 | Bucher et al. |
| 5,694,143 A | 12/1997 | Fielder et al. |
| 5,705,938 A | 1/1998 | Kean |
| 5,766,979 A | 6/1998 | Budnaitis |
| 5,768,178 A | 6/1998 | McLaury |
| 5,778,348 A | 7/1998 | Manduley et al. |
| 5,805,833 A | 9/1998 | Verdun |
| 5,809,230 A | 9/1998 | Pereira |
| 5,815,162 A | 9/1998 | Levine |
| 5,821,949 A | 10/1998 | Deering |
| 5,854,631 A | 12/1998 | Akeley et al. |
| 5,854,637 A | 12/1998 | Sturges |
| 5,872,902 A | 2/1999 | Kuchkuda et al. |
| 5,884,053 A | 3/1999 | Clouser et al. |
| 5,896,391 A | 4/1999 | Solheim et al. |
| 5,909,595 A | 6/1999 | Rosenthal et al. |
| 5,913,218 A | 6/1999 | Carney et al. |
| 5,937,173 A | 8/1999 | Olarig et al. |
| 5,956,252 A | 9/1999 | Lau et al. |
| 5,956,505 A | 9/1999 | Manduley |
| 5,968,175 A | 10/1999 | Morishita et al. |
| 5,977,987 A | 11/1999 | Duluk, Jr. |
| 5,996,996 A | 12/1999 | Brunelle |
| 5,999,990 A | 12/1999 | Sharrit et al. |
| 6,003,083 A | 12/1999 | Davies et al. |
| 6,003,100 A | 12/1999 | Lee |
| 6,028,608 A | 2/2000 | Jenkins |
| 6,034,699 A | 3/2000 | Wong et al. |
| 6,038,348 A | 3/2000 | Carley |
| 6,049,870 A | 4/2000 | Greaves |
| 6,065,131 A | 5/2000 | Andrews et al. |
| 6,067,262 A | 5/2000 | Irrinki et al. |
| 6,067,633 A | 5/2000 | Robbins et al. |
| 6,069,540 A | 5/2000 | Berenz et al. |
| 6,072,500 A | 6/2000 | Foran et al. |
| 6,072,686 A | 6/2000 | Yarbrough |
| 6,085,269 A | 7/2000 | Chan et al. |
| 6,094,116 A | 7/2000 | Tai et al. |
| 6,098,118 A | 8/2000 | Ellenby et al. |
| 6,104,407 A | 8/2000 | Aleksic et al. |
| 6,104,417 A | 8/2000 | Nielsen et al. |
| 6,115,049 A | 9/2000 | Winner et al. |
| 6,118,394 A | 9/2000 | Onaya |
| 6,128,000 A | 10/2000 | Jouppi et al. |
| 6,129,070 A | 10/2000 | Jingu et al. |
| 6,137,918 A | 10/2000 | Harrington et al. |
| 6,160,557 A | 12/2000 | Narayanaswami |
| 6,160,559 A | 12/2000 | Omtzigt |
| 6,188,394 B1 | 2/2001 | Morein et al. |
| 6,201,545 B1 | 3/2001 | Wong et al. |
| 6,204,859 B1 | 3/2001 | Jouppi et al. |
| 6,219,070 B1 | 4/2001 | Baker et al. |
| 6,219,628 B1 | 4/2001 | Kodosky et al. |
| 6,249,288 B1 | 6/2001 | Campbell |
| 6,249,853 B1 | 6/2001 | Porterfield |
| 6,255,849 B1 | 7/2001 | Mohan |
| 6,256,758 B1 | 7/2001 | Abramovici et al. |
| 6,259,460 B1 | 7/2001 | Gossett et al. |
| 6,307,169 B1 | 10/2001 | Sun et al. |
| 6,317,804 B1 | 11/2001 | Levy et al. |
| 6,323,699 B1 | 11/2001 | Quiet |
| 6,323,874 B1 | 11/2001 | Gossett |
| 6,348,811 B1 | 2/2002 | Haycock et al. |
| 6,359,623 B1 | 3/2002 | Larson |
| 6,362,819 B1 | 3/2002 | Dalal et al. |
| 6,363,285 B1 | 3/2002 | Wey |
| 6,363,295 B1 | 3/2002 | Akram et al. |
| 6,366,289 B1 | 4/2002 | Johns |
| 6,366,968 B1 | 4/2002 | Hunsaker |
| 6,370,603 B1 | 4/2002 | Silverman et al. |
| 6,377,898 B1 | 4/2002 | Steffan et al. |
| 6,388,590 B1 | 5/2002 | Ng |
| 6,389,585 B1 | 5/2002 | Masleid et al. |
| 6,392,431 B1 | 5/2002 | Jones |
| 6,429,288 B1 | 8/2002 | Esswein et al. |
| 6,429,747 B2 | 8/2002 | Franck et al. |
| 6,429,877 B1 | 8/2002 | Stroyan |
| 6,433,657 B1 | 8/2002 | Chen |
| 6,437,657 B1 | 8/2002 | Jones |
| 6,437,780 B1 | 8/2002 | Baltaretu et al. |
| 6,452,595 B1 | 9/2002 | Montrym et al. |
| 6,469,707 B1 | 10/2002 | Voorhies |
| 6,480,205 B1 | 11/2002 | Greene et al. |
| 6,486,425 B2 | 11/2002 | Seki |
| 6,501,564 B1 | 12/2002 | Schramm et al. |
| 6,504,542 B1 | 1/2003 | Voorhies et al. |
| 6,504,841 B1 | 1/2003 | Larson et al. |
| 6,522,329 B1 | 2/2003 | Ihara et al. |
| 6,525,737 B1 | 2/2003 | Duluk, Jr. et al. |
| 6,529,207 B1 | 3/2003 | Landau et al. |
| 6,530,045 B1 | 3/2003 | Cooper et al. |
| 6,530,049 B1 | 3/2003 | Abramovici et al. |
| 6,535,986 B1 | 3/2003 | Rosno et al. |
| 6,550,030 B1 | 4/2003 | Abramovici et al. |
| 6,598,194 B1 | 7/2003 | Madge et al. |
| 6,606,093 B1 | 8/2003 | Gossett et al. |
| 6,611,272 B1 | 8/2003 | Hussain et al. |
| 6,614,444 B1 | 9/2003 | Duluk, Jr. et al. |
| 6,614,448 B1 | 9/2003 | Garlick et al. |
| 6,624,823 B2 | 9/2003 | Deering |
| 6,629,181 B1 | 9/2003 | Alappat et al. |
| 6,633,197 B1 | 10/2003 | Sutardja |
| 6,633,297 B2 | 10/2003 | McCormack et al. |
| 6,636,212 B1 | 10/2003 | Zhu |
| 6,646,639 B1 | 11/2003 | Greene et al. |
| 6,662,133 B2 | 12/2003 | Engel et al. |
| 6,671,000 B1 | 12/2003 | Cloutier |
| 6,693,637 B2 | 2/2004 | Koneru et al. |
| 6,693,639 B2 | 2/2004 | Duluk, Jr. et al. |
| 6,697,063 B1 | 2/2004 | Zhu |
| 6,700,581 B2 | 3/2004 | Baldwin et al. |
| 6,701,466 B1 | 3/2004 | Fiedler |
| 6,717,474 B2 | 4/2004 | Chen et al. |
| 6,717,576 B1 | 4/2004 | Duluk, Jr. et al. |
| 6,717,578 B1 | 4/2004 | Deering |
| 6,718,496 B1 | 4/2004 | Fukuhisa et al. |
| 6,734,770 B2 | 5/2004 | Aigner et al. |
| 6,734,861 B1 | 5/2004 | Van Dyke et al. |
| 6,738,856 B1 | 5/2004 | Milley et al. |
| 6,741,247 B1 | 5/2004 | Fenney |
| 6,741,258 B1 | 5/2004 | Peck, Jr. et al. |
| 6,742,000 B1 | 5/2004 | Fantasia et al. |
| 6,747,057 B2 | 6/2004 | Ruzafa et al. |
| 6,747,483 B2 | 6/2004 | To et al. |
| 6,765,575 B1 | 7/2004 | Voorhies et al. |
| 6,778,177 B1 | 8/2004 | Furtner |
| 6,782,587 B2 | 8/2004 | Reilly |

(56) References Cited

U.S. PATENT DOCUMENTS

| | | | |
|---|---|---|---|
| 6,785,841 B2 | 8/2004 | Akrout et al. |
| 6,788,101 B1 | 9/2004 | Rahman |
| 6,788,301 B2 | 9/2004 | Thrasher |
| 6,794,101 B2 | 9/2004 | Liu et al. |
| 6,798,410 B1 | 9/2004 | Redshaw et al. |
| 6,803,782 B2 | 10/2004 | Koob et al. |
| 6,803,916 B2 | 10/2004 | Ramani et al. |
| 6,806,788 B1 | 10/2004 | Marumoto |
| 6,819,332 B2 | 11/2004 | Baldwin |
| 6,823,283 B2 | 11/2004 | Steger et al. |
| 6,825,847 B1 | 11/2004 | Molnar et al. |
| 6,833,835 B1 | 12/2004 | van Vugt |
| 6,849,924 B2 | 2/2005 | Allison et al. |
| 6,850,133 B2 | 2/2005 | Ma |
| 6,861,865 B1 | 3/2005 | Carlson |
| 6,862,027 B2 | 3/2005 | Andrews et al. |
| 6,879,207 B1 | 4/2005 | Nickolls |
| 6,906,716 B2 | 6/2005 | Moreton et al. |
| 6,938,176 B1 | 8/2005 | Alben et al. |
| 6,940,514 B1 | 9/2005 | Wasserman et al. |
| 6,947,057 B2 | 9/2005 | Nelson et al. |
| 6,956,579 B1 | 10/2005 | Diard et al. |
| 6,961,057 B1 | 11/2005 | Van Dyke et al. |
| 6,961,065 B2 | 11/2005 | Sasaki |
| 6,966,020 B1 | 11/2005 | Abramovici et al. |
| 6,973,608 B1 | 12/2005 | Abramovici et al. |
| 6,978,317 B2 | 12/2005 | Anantha et al. |
| 6,982,718 B2 | 1/2006 | Kilgard et al. |
| 7,002,591 B1 | 2/2006 | Leather et al. |
| 7,009,607 B2 | 3/2006 | Lindholm et al. |
| 7,009,615 B1 | 3/2006 | Kilgard et al. |
| 7,020,598 B1 | 3/2006 | Jacobson |
| 7,023,437 B1 | 4/2006 | Voorhies et al. |
| 7,043,622 B2 | 5/2006 | Henry et al. |
| 7,058,738 B2 | 6/2006 | Stufflebeam, Jr. |
| 7,061,495 B1 | 6/2006 | Leather |
| 7,064,771 B1 | 6/2006 | Jouppi et al. |
| 7,069,369 B2 | 6/2006 | Chou et al. |
| 7,069,458 B1 | 6/2006 | Sardi et al. |
| 7,069,558 B1 | 6/2006 | Stone et al. |
| 7,075,542 B1 | 7/2006 | Leather |
| 7,075,797 B1 | 7/2006 | Leonard et al. |
| 7,081,902 B1 | 7/2006 | Crow et al. |
| 7,085,824 B2 | 8/2006 | Forth et al. |
| 7,099,969 B2 | 8/2006 | McAfee et al. |
| 7,119,809 B1 | 10/2006 | McCabe |
| 7,124,318 B2 | 10/2006 | Luick |
| 7,126,600 B1 | 10/2006 | Fowler et al. |
| 7,136,953 B1 | 11/2006 | Bisson et al. |
| 7,154,066 B2 | 12/2006 | Talwar et al. |
| 7,158,148 B2 | 1/2007 | Toji et al. |
| 7,170,315 B2 | 1/2007 | Bakker et al. |
| 7,170,515 B1 | 1/2007 | Zhu |
| 7,174,407 B2 | 2/2007 | Hou et al. |
| 7,174,411 B1 | 2/2007 | Ngai |
| 7,184,040 B1 | 2/2007 | Tzvetkov |
| 7,185,135 B1 | 2/2007 | Briggs et al. |
| 7,185,225 B2 | 2/2007 | Sutardja et al. |
| 7,187,383 B2 | 3/2007 | Kent |
| 7,224,364 B1 | 5/2007 | Yue et al. |
| 7,225,287 B2 | 5/2007 | Wooten |
| 7,246,274 B2 | 7/2007 | Kizer et al. |
| 7,260,007 B2 | 8/2007 | Jain et al. |
| RE39,898 E | 10/2007 | Nally et al. |
| 7,293,125 B2 | 11/2007 | McAfee et al. |
| 7,293,127 B2 | 11/2007 | Caruk |
| 7,305,571 B2 | 12/2007 | Cranford, Jr. et al. |
| 7,307,628 B1 | 12/2007 | Goodman et al. |
| 7,307,638 B2 | 12/2007 | Leather et al. |
| 7,324,452 B2 | 1/2008 | Xu et al. |
| 7,324,458 B2 | 1/2008 | Schoenborn et al. |
| 7,340,541 B2 | 3/2008 | Castro et al. |
| 7,362,325 B2 | 4/2008 | Anderson |
| 7,363,417 B1 | 4/2008 | Ngai |
| 7,373,547 B2 | 5/2008 | Sutardja et al. |
| 7,382,368 B1 | 6/2008 | Molnar et al. |
| 7,383,412 B1 | 6/2008 | Diard |
| 7,398,336 B2 | 7/2008 | Feng et al. |
| 7,412,554 B2 | 8/2008 | Danilak |
| 7,414,636 B2 | 8/2008 | Kokojima et al. |
| 7,415,551 B2 | 8/2008 | Pescatore |
| 7,424,564 B2 | 9/2008 | Mehta et al. |
| 7,437,021 B2 | 10/2008 | Satoh |
| 7,453,466 B2 | 11/2008 | Hux et al. |
| 7,469,311 B1 | 12/2008 | Tsu et al. |
| 7,480,757 B2 | 1/2009 | Atherton et al. |
| 7,480,808 B2 | 1/2009 | Caruk et al. |
| 7,483,029 B2 | 1/2009 | Crow et al. |
| 7,525,986 B2 | 4/2009 | Lee et al. |
| 7,548,996 B2 | 6/2009 | Baker et al. |
| 7,551,174 B2 | 6/2009 | Iourcha et al. |
| 7,594,061 B2 | 9/2009 | Shen et al. |
| 7,631,124 B2 * | 12/2009 | Lockhart et al. ............ 710/62 |
| 7,633,506 B1 | 12/2009 | Leather et al. |
| 7,634,637 B1 | 12/2009 | Lindholm et al. |
| 7,660,917 B2 | 2/2010 | Freking et al. |
| 7,663,633 B1 | 2/2010 | Diamond et al. |
| 7,694,049 B2 | 4/2010 | Goh et al. |
| 7,698,477 B2 | 4/2010 | Breti et al. |
| 7,782,325 B2 | 8/2010 | Gonzalez et al. |
| 7,791,617 B2 | 9/2010 | Crow et al. |
| 7,793,029 B1 | 9/2010 | Parson et al. |
| 7,822,025 B1 | 10/2010 | Joly |
| 7,849,235 B2 | 12/2010 | Ihara et al. |
| 7,965,902 B1 | 6/2011 | Zelinka et al. |
| 8,063,903 B2 | 11/2011 | Vignon et al. |
| 8,099,596 B1 * | 1/2012 | Rusakov et al. ............ 713/164 |
| 8,132,015 B1 | 3/2012 | Wyatt |
| 8,144,166 B2 | 3/2012 | Lyapunov et al. |
| 8,185,566 B2 * | 5/2012 | George et al. ............ 707/821 |
| 8,237,738 B1 | 8/2012 | Crow |
| 8,412,872 B1 | 4/2013 | Wagner et al. |
| 8,417,838 B2 | 4/2013 | Tamasi et al. |
| 8,482,567 B1 | 7/2013 | Moreton et al. |
| 8,532,098 B2 | 9/2013 | Reed et al. |
| 8,687,639 B2 | 4/2014 | Kumar |
| 8,711,161 B1 | 4/2014 | Scotzniovsky et al. |
| 8,724,483 B2 | 5/2014 | Ku et al. |
| 2001/0005209 A1 | 6/2001 | Lindholm et al. |
| 2002/0005729 A1 | 1/2002 | Leedy |
| 2002/0026623 A1 | 2/2002 | Morooka |
| 2002/0031025 A1 | 3/2002 | Shimano et al. |
| 2002/0050979 A1 | 5/2002 | Oberoi et al. |
| 2002/0059392 A1 | 5/2002 | Ellis, III |
| 2002/0087833 A1 | 7/2002 | Burns et al. |
| 2002/0091979 A1 | 7/2002 | Cooke et al. |
| 2002/0097241 A1 | 7/2002 | McCormack et al. |
| 2002/0120723 A1 | 8/2002 | Forth et al. |
| 2002/0130863 A1 | 9/2002 | Baldwin |
| 2002/0138750 A1 | 9/2002 | Gibbs et al. |
| 2002/0140655 A1 | 10/2002 | Liang et al. |
| 2002/0143653 A1 | 10/2002 | DiLena et al. |
| 2002/0158869 A1 | 10/2002 | Ohba et al. |
| 2002/0158885 A1 | 10/2002 | Brokenshire et al. |
| 2002/0196251 A1 | 12/2002 | Duluk, Jr. et al. |
| 2002/0199110 A1 | 12/2002 | Kean |
| 2003/0020173 A1 | 1/2003 | Huff et al. |
| 2003/0023771 A1 | 1/2003 | Erickson et al. |
| 2003/0046472 A1 | 3/2003 | Morrow |
| 2003/0051091 A1 | 3/2003 | Leung et al. |
| 2003/0058244 A1 | 3/2003 | Ramani et al. |
| 2003/0061409 A1 | 3/2003 | RuDusky |
| 2003/0067468 A1 | 4/2003 | Duluk, Jr. et al. |
| 2003/0076325 A1 | 4/2003 | Thrasher |
| 2003/0093506 A1 | 5/2003 | Oliver et al. |
| 2003/0101288 A1 | 5/2003 | Tague et al. |
| 2003/0115500 A1 | 6/2003 | Akrout et al. |
| 2003/0122815 A1 | 7/2003 | Deering |
| 2003/0160795 A1 | 8/2003 | Alcorn et al. |
| 2003/0163589 A1 | 8/2003 | Bunce et al. |
| 2003/0164830 A1 | 9/2003 | Kent |
| 2003/0179631 A1 | 9/2003 | Koob et al. |
| 2003/0194116 A1 | 10/2003 | Wong et al. |
| 2003/0201994 A1 | 10/2003 | Taylor et al. |

(56) References Cited

U.S. PATENT DOCUMENTS

| | | |
|---|---|---|
| 2004/0012082 A1 | 1/2004 | Dewey et al. |
| 2004/0012597 A1 | 1/2004 | Zatz et al. |
| 2004/0046764 A1 | 3/2004 | Lefebvre et al. |
| 2004/0064628 A1 | 4/2004 | Chiu |
| 2004/0085313 A1 | 5/2004 | Moreton et al. |
| 2004/0090974 A1 | 5/2004 | Balakrishnan et al. |
| 2004/0102187 A1 | 5/2004 | Moller et al. |
| 2004/0130552 A1 | 7/2004 | Duluk, Jr. et al. |
| 2004/0183148 A1 | 9/2004 | Blasko, III |
| 2004/0183801 A1 | 9/2004 | Deering |
| 2004/0188781 A1 | 9/2004 | Bar |
| 2004/0196285 A1 | 10/2004 | Rice et al. |
| 2004/0196290 A1 | 10/2004 | Satoh |
| 2004/0207642 A1 | 10/2004 | Crisu et al. |
| 2004/0225787 A1 | 11/2004 | Ma et al. |
| 2004/0227599 A1 | 11/2004 | Shen et al. |
| 2004/0246251 A1 | 12/2004 | Fenney et al. |
| 2005/0030314 A1 | 2/2005 | Dawson |
| 2005/0038947 A1 | 2/2005 | Lueck et al. |
| 2005/0041031 A1 | 2/2005 | Diard |
| 2005/0041037 A1 | 2/2005 | Dawson |
| 2005/0044284 A1 | 2/2005 | Pescatore |
| 2005/0045722 A1 | 3/2005 | Park |
| 2005/0060601 A1 | 3/2005 | Gomm |
| 2005/0066148 A1 | 3/2005 | Luick |
| 2005/0088445 A1 | 4/2005 | Gonzalez et al. |
| 2005/0122338 A1 | 6/2005 | Hong et al. |
| 2005/0125629 A1 | 6/2005 | Kissell |
| 2005/0134588 A1 | 6/2005 | Aila et al. |
| 2005/0134603 A1 | 6/2005 | Iourcha et al. |
| 2005/0138437 A1* | 6/2005 | Allen et al. ............... 713/300 |
| 2005/0172135 A1 | 8/2005 | Wiersma |
| 2005/0173233 A1 | 8/2005 | Kaelberer |
| 2005/0174353 A1 | 8/2005 | Alcorn et al. |
| 2005/0179698 A1 | 8/2005 | Vijayakumar et al. |
| 2005/0182881 A1 | 8/2005 | Chou et al. |
| 2005/0210472 A1 | 9/2005 | Accapadi et al. |
| 2005/0237083 A1 | 10/2005 | Bakker et al. |
| 2005/0246460 A1 | 11/2005 | Stufflebeam |
| 2005/0251358 A1 | 11/2005 | Van Dyke et al. |
| 2005/0251761 A1 | 11/2005 | Diamond et al. |
| 2005/0259100 A1 | 11/2005 | Teruyama |
| 2005/0261863 A1 | 11/2005 | Van Dyke et al. |
| 2005/0275663 A1 | 12/2005 | Kokojima et al. |
| 2005/0278666 A1 | 12/2005 | Diamond |
| 2005/0285863 A1 | 12/2005 | Diamond |
| 2006/0004536 A1 | 1/2006 | Diamond et al. |
| 2006/0033745 A1 | 2/2006 | Koselj et al. |
| 2006/0044317 A1 | 3/2006 | Bourd et al. |
| 2006/0053188 A1 | 3/2006 | Mantor et al. |
| 2006/0053189 A1 | 3/2006 | Mantor |
| 2006/0055641 A1 | 3/2006 | Robertus et al. |
| 2006/0106911 A1 | 5/2006 | Chapple et al. |
| 2006/0123177 A1 | 6/2006 | Chan et al. |
| 2006/0132495 A1 | 6/2006 | Anderson |
| 2006/0170690 A1 | 8/2006 | Leather |
| 2006/0179484 A1* | 8/2006 | Scrimsher et al. ............... 726/23 |
| 2006/0190663 A1 | 8/2006 | Lu |
| 2006/0203005 A1 | 9/2006 | Hunter |
| 2006/0221086 A1 | 10/2006 | Diard |
| 2006/0245001 A1 | 11/2006 | Lee et al. |
| 2006/0252285 A1 | 11/2006 | Shen |
| 2006/0267981 A1 | 11/2006 | Naoi |
| 2006/0267987 A1 | 11/2006 | Litchmanov |
| 2006/0282604 A1 | 12/2006 | Temkine et al. |
| 2007/0011383 A1 | 1/2007 | Berke et al. |
| 2007/0038794 A1 | 2/2007 | Purcell et al. |
| 2007/0050647 A1 | 3/2007 | Conroy et al. |
| 2007/0067535 A1 | 3/2007 | Liu |
| 2007/0088877 A1 | 4/2007 | Chen et al. |
| 2007/0115271 A1 | 5/2007 | Seo et al. |
| 2007/0115290 A1 | 5/2007 | Polzin et al. |
| 2007/0115291 A1 | 5/2007 | Chen et al. |
| 2007/0139440 A1 | 6/2007 | Crow et al. |
| 2007/0268298 A1 | 11/2007 | Alben et al. |
| 2007/0273689 A1 | 11/2007 | Tsao |
| 2007/0296725 A1 | 12/2007 | Steiner et al. |
| 2008/0024497 A1 | 1/2008 | Crow et al. |
| 2008/0024522 A1 | 1/2008 | Crow et al. |
| 2008/0072098 A1 | 3/2008 | Hunsaker et al. |
| 2008/0100618 A1 | 5/2008 | Woo et al. |
| 2008/0198163 A1 | 8/2008 | Nakahashi et al. |
| 2008/0273218 A1 | 11/2008 | Kitora et al. |
| 2008/0273545 A1 | 11/2008 | Sgouros et al. |
| 2008/0304652 A1* | 12/2008 | Ray ............................. 379/386 |
| 2009/0006708 A1 | 1/2009 | Lim |
| 2009/0044003 A1 | 2/2009 | Berthiaume et al. |
| 2009/0086747 A1 | 4/2009 | Naven et al. |
| 2009/0106754 A1* | 4/2009 | Liu et al. ............................. 718/1 |
| 2009/0254692 A1 | 10/2009 | Feehrer |
| 2010/0138675 A1* | 6/2010 | Nikazm et al. ............... 713/300 |
| 2010/0162252 A1* | 6/2010 | Bacher ............................. 718/102 |
| 2010/0309918 A1 | 12/2010 | Kumar |
| 2011/0153957 A1* | 6/2011 | Gao et al. ............................. 711/147 |

FOREIGN PATENT DOCUMENTS

| | | |
|---|---|---|
| JP | 06180758 | 6/1994 |
| JP | 10134198 | 5/1998 |
| JP | 11195132 | 7/1999 |
| JP | 11328133 A2 | 11/1999 |
| JP | 2002076120 A2 | 3/2002 |
| JP | 2005182547 | 7/2005 |
| TW | 093127712 | 7/2005 |
| WO | 0013145 | 3/2000 |
| WO | 02/054224 A1 | 7/2002 |
| WO | 2004030127 | 3/2005 |
| WO | 2005029329 | 3/2005 |

OTHER PUBLICATIONS

Addressing the System-on-a-Chip Interconnect Woes Through Communication-Based Design' by Sgroi et al., DAC 2001, Jun. 18-22, 2001, copyright ACM.

Dictionary.com, Definition of "Monitor", Viewed Jun. 15, 2011.

European Patent Office E-Space Family List for: WO200529329 (PCT/US2004030127).

International Search Report. PCT/US2004/030127. Mail Date Jun. 30, 2005.

Multimedia Processors by Kuroda et al., Proceedings of the IEEE, Jun. 1998.

OSI Reference Model—The ISO Model of Architecture for Open Systems Interconnection, by Zimmermann, IEEE Transactions on Communicaions, Apr. 1980.

PCI Express Card Electromechanical Specification Rev. 1.1, 2005, p. 87.

PCT International Preliminary Report on Patentability. PCT/US2004/030127. International Filing Date Sep. 13, 2004. Applicant: Nvidia Corporation. Date of Issuance of this report: Mar. 16, 2006.

SuperPaint: An Early Frame Buffer Graphics System, by Richard Shoup, IEEE Annals of the History of Computing, copyright 2001.

Test Requirements for Embedded Core-Based Systems and IEEE P1500' by Yervant Zorian, International Test Conference, copyright IEEE 1997.

Welch, D. "Building Self-Reconfiguring Distributed Systems Using Compensating Reconfiguration", Proceedings Fourth International Journal Conference on Configurable Distributed Systems, May 4-6, 1998, pp. 18-25.

A parallel algorithm for polygon rasterization Juan Pineda Jun. 1988 ACM.

A VLSI architecture for updating raster-scan displays Satish Gupta, Robert F. Spro ull, Ivan E. Sutherland Aug. 1981 ACM SIGGRAPH Computer Graphics, Proceedings of the 8th annual conference on Computer graphics and interactive techniques SIGGRAPH '81, vol. 15 Issue 3 Publisher: ACM Press.

Blythe, OpenGL Section 3.4.1, "Basic Line Segment Rasterization", Mar. 29, 1997, pp. 1-3.

(56) References Cited

OTHER PUBLICATIONS

Boyer, et al.; "Discrete Analysis for Antialiased Lines," Eurographics 2000; 3 Pages.

Crow; "The Use of Grayscale for Improves Raster Display of Vectors and Characters;" University of Texas, Austin, Texas; Work supported by the National Science Foundation unser Grants MCS 76-83889; pp. 1-5: ACM Press.

* cited by examiner

INPUT/OUTPUT REQUEST PACKET HANDLING TECHNIQUES BY A DEVICE SPECIFIC KERNEL MODE DRIVER

BACKGROUND OF THE INVENTION

Conventional computing systems may include a discrete graphics processing unit (dGPU) or an integral graphics processing unit (iGPU). The discrete GPU and integral GPU are heterogeneous because of their different designs. The integrated GPU generally has relatively poor processing performance compared to the discrete GPU. However, the integrated GPU generally consumes less power compared to the discrete GPU. A heterogeneous graphics processing computing system attempts to utilize the discrete and integral computing devices to improve overall performance.

In the conventional art, the operating system handles all input/output request packets (IRP) for graphics devices. Accordingly, in a graphics co-processing computing system, handling of IRPs is limited by any restrictions imposed, intentionally or unintentionally, by the operating system. Such restrictions may limit the overall performance. Therefore, there is a need to enable IRP handling techniques that are not limited by the operating system.

SUMMARY OF THE INVENTION

The present technology may best be understood by referring to the following description and accompanying drawings that are used to illustrate embodiments of the present technology.

Embodiments of the present technology are directed toward input/output request packet (IRP) handling techniques by a device specific kernel mode driver. In one embodiment, the technique includes receiving by a device specific kernel mode driver a dispatch table including a plurality of input/output manager function pointers from an input/output manager. The dispatch table including the plurality of input/output manager function pointers is sent from device specific kernel mode driver to an operating system kernel mode driver. A dispatch table including the plurality of input/output manager function pointers and a plurality of operating system function pointers is receiving by the device specific kernel mode driver from the operating system kernel mode driver. The dispatch table including the plurality of input/output manager function pointers and the plurality of operating system function pointers is stored by the device specific kernel mode driver. The device specific kernel mode driver also creates a dispatch table including the plurality of input/output manager function pointers and the plurality of operating system functions wherein one or more of the operating system function pointers are replaced by one or more device specific kernel mode driver function pointers. The dispatch table including the plurality of input/output manager function pointers and the plurality of operating system functions wherein one or more of the operating system function pointers are replaced by one or more device specific kernel mode driver function pointers are sent by the device specific kernel mode driver to an input/output manager.

Thereafter, input/output request packets are received by a device specific kernel mode driver. The device specific kernel mode driver determines if any of the input/output request packets should receive a given handling. If an input/output request packet should receive the given handling, the input/output request packet is dispatched to a device specific dispatch IRP handler. If the input/output request packet should not receive the given handling the input/output request packet is redirected to an operating system dispatch IRP handler.

In another embodiment, the technique includes passing a dispatch table including a plurality of input/output manager function pointers from an input/output manager to a device specific kernel mode driver. The dispatch table including the plurality of input/output manager function pointers is passed from the device specific kernel mode driver to an operating system kernel mode driver. A dispatch table including the plurality of input/output manager function pointers and a plurality of operating system function pointers is passed from the operating system kernel mode driver to the device specific kernel mode driver. The dispatch table including the plurality of input/output manager function pointers and the plurality of operating system function pointers is stored in a dispatch table of device specific kernel mode driver. A dispatch table including the plurality of input/output manager function pointers and the plurality of operating system functions wherein one or more of the operating system function pointers are replaced by one or more device specific kernel mode driver function pointers is passed from the device specific kernel mode driver to the input/output manager.

Thereafter, input/output request packets are passed from an input/output manager to a dispatch function of the device specific kernel mode driver. The dispatch function determines if the input/output request packet should receive a given handling. The input/output request packet is dispatched from the dispatch function to a device specific dispatch IRP handler if the input/output request packet is to receive the given handling. Otherwise, the input/output request packet is redirected from the dispatch handler to an operating system dispatch IRP handler if the input/output request packet is not to receive the given handling.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Embodiments of the present technology enable the ability to hook one or more IRPs and decide how to handle the IRPs. Embodiments may be utilized to provide a given handling for one or more hooked IRPs.

Figure 1:
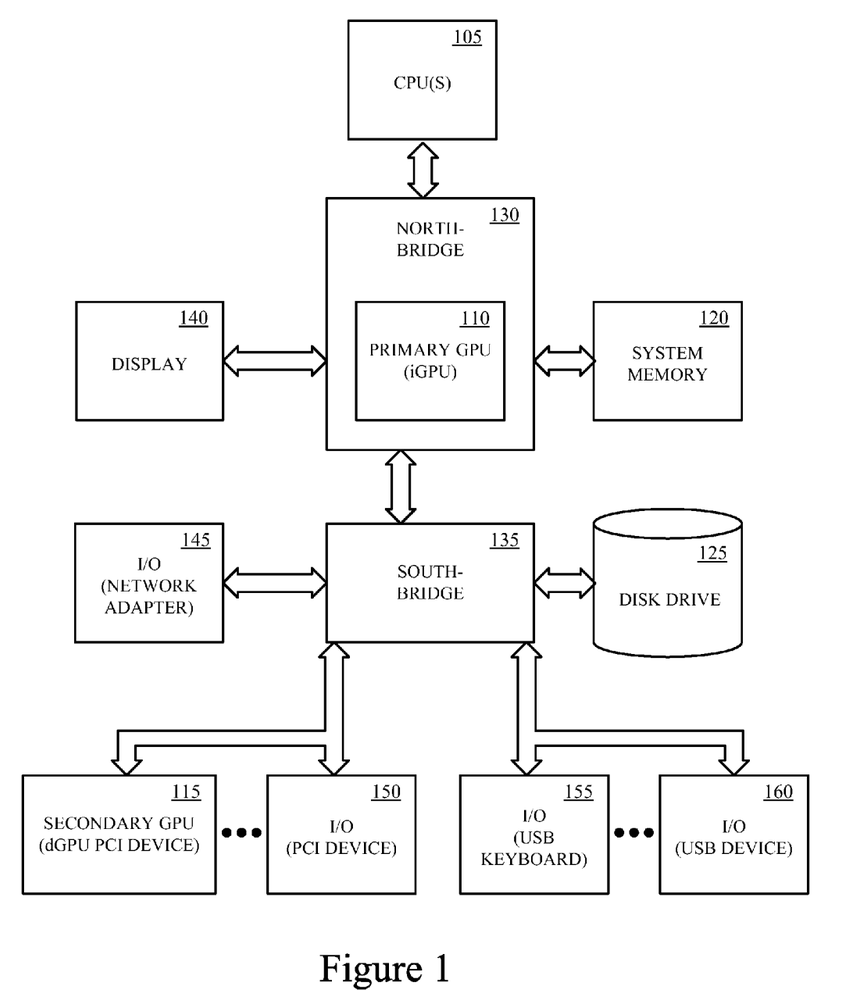
FIG. 1 shows a graphics co-processing computing platform, in accordance with one embodiment of the present technology.

Referring to FIG. 1, a graphics co-processing computing platform, in accordance with one embodiment of the present technology is shown. The exemplary computing platform may include one or more central processing units (CPUs) 105, a plurality of graphics processing units (GPUs) 110, 115, volatile and/or non-volatile memory (e.g., computer readable media) 120, 125, one or more chip sets 130, 135, and one or more peripheral devices 115, 140-160 communicatively coupled by one or more busses. The GPUs include heterogeneous designs. In one implementation, a primary GPU may be an integral graphics processing unit (iGPU) and a secondary GPU may be a discrete graphics processing unit (dGPU). The chipset 130, 135 acts as a simple input/output hub for communicating data and instructions between the CPU 105, the GPUs 110, 115, the computing device-readable media 120, 125, and peripheral devices 115, 140-165. In one implementation, the chipset includes a northbridge 130 and southbridge 135. The northbridge 130 provides for communication between the CPU 105, system memory 120 and the southbridge 135. In one implementation, the northbridge 130 includes an integral GPU. The southbridge 135 provides for input/output functions. The peripheral devices 115, 140-165 may include a display device 140, a network adapter (e.g., Ethernet card) 145, CD drive, DVD drive, a keyboard, a pointing device, a speaker, a printer, and/or the like. In one implementation, the secondary GPU is coupled as a discrete GPU peripheral device 115 by a bus such as a Peripheral Component Interconnect Express (PCIe) bus.

The computing device-readable media 120, 125 may be characterized as primary memory and secondary memory. Generally, the secondary memory, such as a magnetic and/or optical storage, provides for non-volatile storage of computer-readable instructions and data for use by the computing device. For instance, the disk drive 125 may store the operating system (OS), applications and data. In one implementation, the operating system may be a Windows Operating System from Microsoft Corporation in Redmond, Wash., U.S.A. The primary memory, such as the system memory 120 and/or graphics memory, provides for volatile storage of computer-readable instructions and data for use by the computing device. For instance, the system memory 120 may temporarily store a portion of the operating system, a portion of one or more applications and associated data that are currently used by the CPU 105, GPU 110 and the like.

Generally, the GPU attached to the display 140 is designated as the primary GPU 110 and the other GPU is designated as the secondary GPU 115. However, the secondary GPU 115 may be the primary computational unit. In other implementation, the computation workload may be dynamically switched between the primary and secondary GPU 110, 115 based on processing performance, power consumption, and the like parameters.

Figure 2:
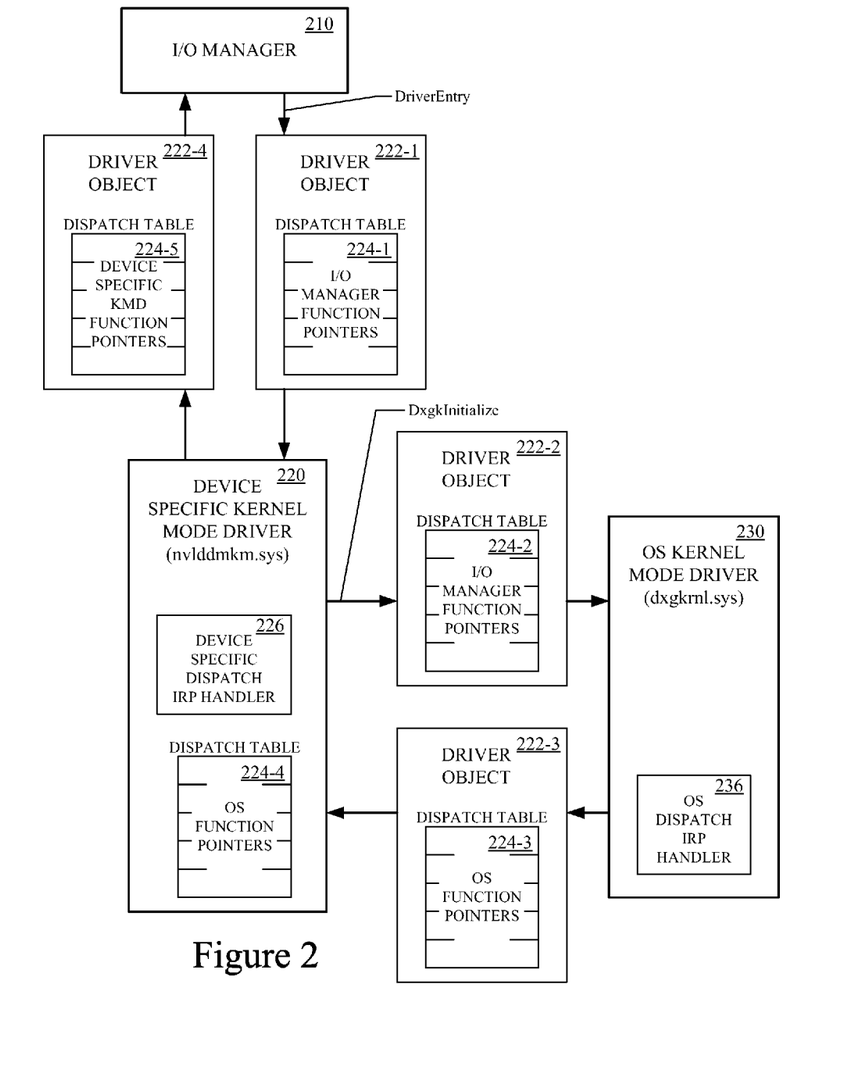
FIG. 2 shows a technique for initializing input/output request packet (IRP) handling, in accordance with one embodiment of the present technology.

Referring now to FIG. 2, a technique for initializing IRP handling, in accordance with one embodiment of the present technology, is shown. During initialization of the graphics co-processing computing system, an input/output (I/O) manager 210 loads and initializes a device specific kernel mode driver (e.g., nvlddmkm.sys) 220 for a secondary GPU (e.g., dGPU) 115. In one implementation, the I/O manager 210 calls a driver entry point (e.g., DriverEntry) to load the device specific kernel mode driver 220. When calling the driver specific kernel mode driver 220, the I/O manager 210 passes a dispatch table 224-1 in a driver object 222-1 to the device specific kernel mode driver 220. The dispatch table 224-1 passed to the device specific kernel mode driver 220 includes pointers to one or more functions of the I/O manager 210.

The device specific kernel mode driver 220, for the secondary GPU 115, calls the OS graphics driver subsystem. In one implementation, the device specific kernel mode driver 220 calls an operating system (OS) kernel mode driver (e.g., dxgkrnl.sys) 230. In one implementation, the device specific kernel mode driver 220 calls a driver entry point (e.g., DxgkInitialize) of the OS kernel mode driver 230. The device specific kernel mode driver 220 passes a dispatch table 224-2 in a driver object 222-2 to the OS kernel mode driver 230. The dispatch table 224-2 passed to the OS kernel mode driver 230 includes the I/O manager function pointers.

After receiving the dispatch table 224-2, the OS kernel mode driver 230 returns back to the device specific kernel mode driver 220. When returning back to the device specific kernel mode driver 220, the dispatch table 224-3, passed in a driver object 222-3, includes a plurality of pointers to functions of the OS kernel mode driver 230 and may also include the I/O manager function pointers. The plurality of functions pointers of the OS kernel mode driver 230 includes function pointers to OS dispatch IRP handlers 236. The device specific kernel mode driver 220 stores a copy of the dispatch table 224-3 received from the OS kernel mode driver 230 as dispatch table 224-4. The device specific kernel mode driver 220 also creates a dispatch table 224-5 by replacing one or more OS function pointers with one or more pointers to a dispatch handler in the device specific kernel mode driver 220. The replaced function pointers are for calls that are to receive a given handling. In one implementation, the given handling may be a power control function. In one implementation, the function pointer to the OS dispatch IRP handler 236 in the OS dispatch table 224-3 that is for turning on or off the GPU, is replaced with a function pointer to the device specific kernel mode driver dispatch IRP handler 226 local to the device specific kernel mode driver 220.

The device specific kernel mode driver 220 for the secondary GPU 115 then returns back to the I/O manager 210. When returning back to the I/O manager 210, the dispatch table 224-5, passed in a driver object 222-4, includes a plurality of pointers to functions of OS kernel mode driver and the device kernel mode driver 220. The function pointers to the device specific kernel mode driver 220 include pointers to the dispatch IRP handlers 226 of the device specific kernel mode driver 220, and the dispatch table 224-4.

Accordingly, the I/O manager 210, device specific kernel mode driver and OS kernel mode driver 230 pass around a dispatch table 224 in the driver object 222. The I/O manager 210, device specific kernel mode driver and OS kernel mode driver 230 each fill the dispatch table with their respective function pointers. The device specific kernel mode driver 220, however, replaces one or more OS kernel mode driver 230 function pointers with pointers to the device specific kernel mode dispatch IRP handlers 226.

Figure 3:
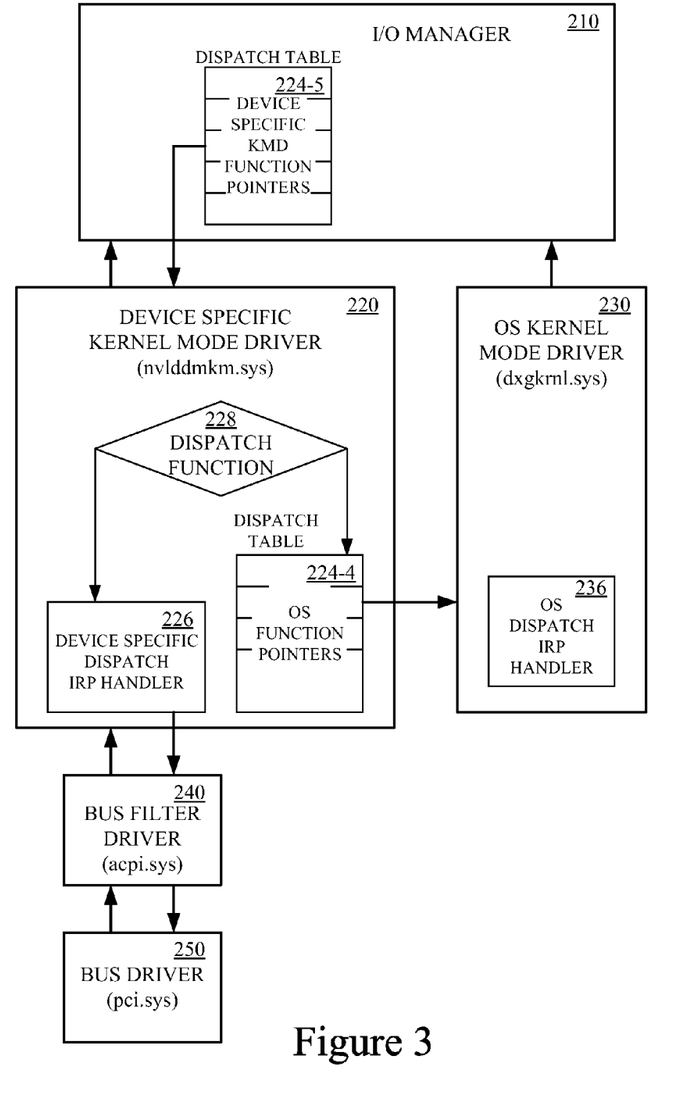
FIG. 3 shows a technique for IRP handling, in accordance with one embodiment of the present technology.

Referring now to FIG. 3, a technique for IRP handling, in accordance with one embodiment of the present technology, is shown. The I/O manager 210, after creating an IRP in response to an I/O request for the user mode, plug-and-play manager, power manager, driver, or other system component, calls the dispatch function 228 of the device specific kernel mode driver 220 using function pointer in the dispatch table 224-5 stored by the I/O manager 210. When calling the dispatch function 228, the I/O manager passes a pointer to the IRP. The IRP is a data structure, including arguments and parameters such as buffer address, buffer size, I/O function type and/or the like, that describes the I/O request. The dispatch function 228 looks at the content of the IRP to determine whether or not to hook the IRP. If the dispatch function 228 determines that the IRP is to receive a given handling, the dispatch function 228 routes the IRP to the device specific dispatch IRP handler 226 local to the device specific kernel mode driver 220. In one implementation, the dispatch function 228 may determine that a power control IRP, plug-and-play IRP or the like needs special handling and routs the power control IPR to the device specific dispatch IRP handler 226 local to the device specific kernel mode driver 220. The device specific dispatch IRP handler 226 calls a function local to the device specific kernel mode driver 220 to handle the IRP and/or routes the IRP to a lower level driver, such as a bus filter driver 240 and/or bus driver 250, if needed. For example, the dispatch function may determine that a start, set power, or go to sleep type I/O request for the secondary GPU 115 needs a given handling by the device specific dispatch IRP handler 226 of the device specific kernel mode driver 220, instead of by the OS dispatch IRP handler 236 of the OS kernel mode driver 230. If the IRP is completed through the device specific kernel mode driver 220, the device specific kernel mode driver 220 reports completion back to the I/O manager 210.

If the IRP is not to receive the given handling, the dispatch function 228 redirects the IRP back to the OS dispatch IRP handler 236 of the OS kernel mode driver 230 using an OS function pointer in the dispatch table 224-4 stored by the device specific kernel mode driver 220. In response, the OS dispatch IRP handler 236 of the OS kernel mode driver 230 calls a function of the OS kernel mode driver and/or routes the IRP to a lower driver, if needed. If the IRP is completed through the OS kernel mode driver 230, the OS kernel mode driver 230 reports completion back to the I/O manager 210.

The given handling may be provided by the functions of the device specific kernel mode driver 220, instead of the OS kernel mode driver 230. Accordingly, embodiments of the present technology enable IRP handling techniques that are not limited by the operating system.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. One or more non-transitory computing device readable media having computing device executable instructions which when executed perform a method comprising:
    receiving, by a device specific kernel mode driver, a dispatch table including a pluralityy of input/output manager function pointers;
    sending, by the device specific kernel mode driver to an operating system kernel mode driver, the dispatch table including the plurality of input/output manager function pointers;
    receiving, by the device specific kernel mode driver, a dispatch table including the plurality of input/output manager function pointers and a plurality of operating system function pointers;
    storing, by the device specific kernel mode driver, the dispatch table including the plurality of input/output manager function pointers and the plurality of operating system function pointers;
    creating, by the device specific kernel mode driver, a dispatch table including the plurality of input/output manager function pointers and the plurality of operating system functions wherein one or more of the operating system function pointers are replaced by one or more device specific kernel mode driver function pointers;
    sending, by the device specific kernel mode driver to an input/output manager, the dispatch table including, the plurality of input/output manager function pointers and the plurality of operating system functions wherein one or more of the operating system function pointers are replaced by one or more device specific kernel mode driver function pointers;
    receiving, by a device specific kernel mode driver, a input/output request packet from the input/output manager based on the dispatch table including the plurality of input/output manager function pointers and the plurality of operating system functions wherein one or more of the operating system function pointers are replaced by one or more device specific kernel mode driver function pointers from the device specific kernel mode driver to the input/output manager;
    determining, by the device specific kernel mode driver, if the input/output request packet is to receive a given handling;
    dispatching, by the device specific kernel mode driver using an operating system function pointer in the dispatch table stored by the device specific kernel mode driver, the input/output request packet to a device specific dispatch input/output request packet handler if the input/output request packet is to receive the given handling; and
    redirecting, by the device specific kernel mode driver using an operating system function pointer in the dispatch table stored by the device specific kernel mode driver, the input/output request packet to an operating system dispatch input/output request packet handler if the input/output request packet is not to receive the given handling.

2. The one or more non-transitory computing device readable media having computing device executable instructions which when executed perform the method of claim 1, wherein the input/output request packet is to receive the given handling the input/output request packet comprises a power type input/output request packet.

3. The one or more non-transitory computing device readable media having computing device executable instructions which when executed perform the method of claim 1, wherein the input/output request packet is to receive the given handling if the input/output request packet comprises a plug-and-play type input/output request packet.

4. The one or more non-transitory computing device readable media having computing device executable instructions which when executed perform the method of claim 1, wherein the input/output request is for a secondary graphics processing unit of a computing device including a primary graphics processing unit.

5. The one or more non-transitory computing device readable media having computing device executable instructions which when executed perform the method of claim 4, wherein the primary graphics processing unit and the secondary graphics processing unit are heterogeneous graphics processing units.

6. The one or more non-transitory computing device readable media having computing, device executable instructions which when executed perform the method of claim 1, wherein determining if the input/output request packet should receive a given handling comprises calling a dispatch function; local to the device specific kernel mode driver, to determine a content of the input/output request packet.

7. The one or more non-transitory computing device readable media having computing device executable instructions which when executed perform the method of claim 1, further comprising calling, by the device specific dispatch handler, a corresponding function for the input/output request packet if the input/output request packet is to receive the given handling.

8. The one or more non-transitory computing device readable media having computing device executable instructions which when executed perform the method of claim 1, further comprising calling, by the device specific dispatch handler, a corresponding driver for the input/output request packet if the input/output request packet is to receive the given handling.

9. One or more non-transitory computing device readable media having, computing device executable instructions which when executed perform a method comprising:
   passing a dispatch table including a plurality of input/output manager function pointers from an input/output manager to a device specific kernel mode driver;
   passing the dispatch table including the plurality of input/output manager function pointers from the device specific kernel mode driver to an operating system kernel mode driver;
   passing a dispatch table including the plurality of input/output manager function pointers and a plurality of operating system function pointers from the operating system kernel mode driver to the device specific kernel mode driver;
   storing the dispatch table including the plurality of input/output manager function pointers and the plurality of operating system function pointers in a dispatch table of device specific kernel mode driver;
   passing a dispatch table including the plurality of input/output manager function pointers and the plurality of operating system functions wherein one or more of the operating system function pointers are replaced by one or more device specific kernel, mode driver function pointers from the device specific kernel mode driver to the input/output manager;
   passing a input/output request packet from the input/output manager to a dispatch function of the device specific kernel mode driver based on the dispatch table including the plurality of input/output manager function pointers and the plurality of operating system functions wherein one or more of the operating system function pointers are replaced by one or more device specific kernel mode driver function pointers from the device specific kernel mode driver to the input/output manager;
   determining, by the dispatch function, if the input/output request packet should receive a given handling;
   dispatching the input/output request packet from the dispatch function to a device specific dispatch input/output request packet handler if the input/output request packet is to receive the given handling; and
   redirecting the input/output request packet from the dispatch function to an operating system dispatch input/output request packet handler if the input/output request packet is not to receive the given handling.

10. The one or more non-transitory computing device readable media having computing device executable instructions which when executed perform the method of claim 9, wherein the input/output request packet is to receive the given handling if the input/output request packet comprises a power type input/output request packet.

11. The one or more non-transitory computing device readable media having computing device executable instructions which when executed perform the method of claim 9, wherein the given handling comprises a power control function.

12. The one or more non-transitory computing device readable media having computing device executable instructions which when executed perform the method of claim 9, wherein determining if the input/output request packet should receive a given handling comprises calling a dispatch function, local to the device specific kernel mode driver, to determine a content of the input/output request packet.

13. The one or more non-transitory computing device readable media having computing device executable instructions which when executed perform the method of claim 9, further comprising calling, by the device specific dispatch handler, a corresponding function for the input/output request packet if the input/output request packet is to receive the given handling.

14. The one or more non-transitory computing device readable media having computing device executable instructions which when executed perform the method of claim 9, further comprising calling, by the device specific dispatch handler, a corresponding driver for the input/output request packet if the input/output request packet is to receive the given handling.

15. The one or more non-transitory computing device readable media having computing device executable instructions which when executed perform the method of claim 9, wherein the input/output request is for a discrete graphics processing unit of a computing device including an integrated graphics processing unit.

16. The one or more non-transitory computing device readable media having computing device executable instructions which when executed perform the method of claim 15, wherein the discrete graphics processing unit and the integrated graphics processing unit are heterogeneous graphics processing units.

\* \* \* \* \*